United States Patent
La Marca et al.

(10) Patent No.: US 10,554,444 B2
(45) Date of Patent: Feb. 4, 2020

(54) METHOD AND DEVICE FOR OPERATING A BUS SYSTEM

(71) Applicant: Robert Bosch GmbH, Stuttgart (DE)

(72) Inventors: Antonio La Marca, Leonberg (DE); Joachim Steinmetz, Erdmannhausen (DE); Liem Dang, Ludwigsburg (DE); Marco Neumann, Stuttgart (DE); Benjamin Herrmann, Ludwigsburg (DE); Michael Beuten, Schwieberdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/643,791

(22) Filed: Jul. 7, 2017

(65) Prior Publication Data
US 2018/0019895 A1  Jan. 18, 2018

(30) Foreign Application Priority Data
Jul. 13, 2016 (DE) .......... 10 2016 212 816

(51) Int. Cl.
| | | |
|---|---|---|
| *H04L 12/413* | (2006.01) | |
| *G06F 21/52* | (2013.01) | |
| *G06F 21/55* | (2013.01) | |
| *H04L 1/24* | (2006.01) | |
| *H04L 12/40* | (2006.01) | |
| *H04L 29/08* | (2006.01) | |

(52) U.S. Cl.
CPC .......... *H04L 12/4135* (2013.01); *G06F 21/52* (2013.01); *G06F 21/554* (2013.01); *H04L 1/242* (2013.01); *H04L 12/40032* (2013.01); *H04L 67/1097* (2013.01)

(58) Field of Classification Search
CPC ... H04L 12/4135; H04L 67/143; H04L 12/40; H04L 67/141; H04L 67/12; H04L 1/242; H04L 12/40032; H04L 67/1097; G06F 13/38; G06F 21/554; G06F 21/52; G06F 21/85; G06F 9/451
USPC ......................................................... 714/799
See application file for complete search history.

(56) References Cited

U.S. PATENT DOCUMENTS

| | | | | |
|---|---|---|---|---|
| 4,620,302 A * | 10/1986 | Binoeder | ........... | G01R 31/3193 714/700 |
| 4,890,224 A * | 12/1989 | Fremont | ............. | G06F 11/2007 710/11 |
| 5,422,877 A * | 6/1995 | Brajczewski | ....... | G06F 11/2007 340/2.9 |
| 5,894,485 A * | 4/1999 | Halligan | ............... | G06F 3/0623 714/807 |

(Continued)

FOREIGN PATENT DOCUMENTS

| | | |
|---|---|---|
| DE | 102009026995 A1 | 3/2011 |
| WO | 2014061021 A1 | 4/2014 |

*Primary Examiner* — James C Kerveros
(74) *Attorney, Agent, or Firm* — Norton Rose Fulbright US LLP; Gerard Messina

(57) ABSTRACT

A method for operating a bus system in which a message of the bus system is received and its validity is ascertained, characterized in that, when it has been ascertained that the message is "not valid", a defend message is transmitted to a designated recipient of the message, the defend message being configured so that the designated recipient is instructed by way of the defend message to initiate defensive measures against the message.

32 Claims, 3 Drawing Sheets

(56) References Cited

U.S. PATENT DOCUMENTS

| | | | | |
|---|---|---|---|---|
| 8,165,160 B2* | 4/2012 | Dunstan | ............... | H04L 1/0061 |
| | | | | 370/471 |
| 8,234,376 B2* | 7/2012 | Jimmei | ............. | H04L 29/12066 |
| | | | | 709/217 |
| 8,443,256 B2* | 5/2013 | Shafai | .................. | H04L 1/0061 |
| | | | | 714/758 |
| 2012/0192044 A1* | 7/2012 | Shafai | ................. | H03M 13/091 |
| | | | | 714/807 |
| 2012/0304017 A1* | 11/2012 | Martin | ............... | G06F 11/1641 |
| | | | | 714/43 |
| 2015/0191135 A1 | 7/2015 | Ben Noon et al. | | |

* cited by examiner

METHOD AND DEVICE FOR OPERATING A BUS SYSTEM

RELATED APPLICATION INFORMATION

The present application claims priority to and the benefit of German patent application no. 10 2016 212 816.7, which was filed in Germany on Jul. 13, 2016, the disclosure which is incorporated herein by reference.

FIELD OF THE INVENTION

The present invention relates to a method for operating a bus system, in particular in a motor vehicle, a computer program and a control and/or regulating unit for carrying out the method, and to a machine-readable memory medium on which the computer program is stored.

BACKGROUND INFORMATION

A method for operating a bus system, in particular a CAN bus, is described in DE 10 2009 026 995 A1. The bus system may be connected to multiple stations. A transmitted message includes an identifier, a certain identifier (e.g., IDENT2) being permitted for use by only one single station at any time. Each of the stations compares the identifier of a transmitted message to the identifiers it uses itself (e.g., IDENT2). If there is a match, an error message is generated.

SUMMARY OF THE INVENTION

The method having the features described herein has the advantage that irregular interventions in a network of this bus system may be detected particularly effectively in order to block or prevent the interventions, as necessary, in a targeted manner. One advantage of the present invention is therefore the increase in the network integrity with respect to manipulative interventions in the network.

Yet another advantage is that security vulnerabilities may be exposed and, therefore, it becomes possible to eliminate these security vulnerabilities with the aid of a software update.

Yet another advantage of the present invention is that the defense against irregular interventions in the network takes place with the aid of an existing on-board arrangement. In particular, the defense may take place with the aid of further functions in the affected network user, which are activated via the network.

Yet another decisive advantage of the present invention is that the mode of operation of the network is not adversely affected during a defensive action, i.e., the function of the systems and/or control units (the term "control unit" is utilized here and in the following, without limitation, as a synonymous short term for "control and/or regulating unit") connected to the network is not adversely affected, since full compatibility is ensured due to the targeted utilization of existing on-board arrangement to avert an irregular intervention.

Interventions in a motor vehicle may take place with the aid of standardized or proprietary protocols via which the network users exchange data and/or commands. These standardized or proprietary protocols may be either stateful or stateless.

In the case of stateful protocols, the following situations, in particular, may result: Control units in the vehicle may contain special diagnostic functions in order to simplify diagnoses on motor vehicles. These diagnostic functions may enable, for example, interventions such as the control of electric motors or valves in the vehicle. The diagnostic functions may further permit states to be established, which are undesirable during the regular operation of the motor vehicle. Furthermore, diagnostic functions may be utilized for reading out data from control units in order to draw inferences regarding the software present on the control units or regarding a state of the motor vehicle.

The diagnostic functions themselves may be started, for example, via standardized diagnostic protocols such as, for example, ISO 14229, e.g., with the aid of a workshop tester in the control unit.

In the case of critical diagnostic functions, the ISO 14229 standard, for example, calls for simple monitoring which ensures that there is an active connection between a selected control unit (the "target control unit") and the workshop tester. For this purpose, a "non-default" diagnostic session is initially started in the target control unit with the aid of a dedicated network message to the target control unit. The actual diagnostic functions may be subsequently started.

It may be provided to generically stop previously activated diagnostic functions when an active "non-default" diagnostic session is exited. An active diagnostic session may be exited when, for example, the timeout monitoring of the "non-default" diagnostic session starts due to the absence of a "keep alive" message, for example, via the TesterPresent diagnostic service described in ISO 14229, a new session is actively started, for example, via the DiagnosticSessionControl diagnostic service described in ISO 14229, or when a protocol switch takes place in the control unit due to the query of another diagnostic protocol which has higher priority.

In addition to the generic methods for terminating an activated diagnostic function, there are also possibilities for deactivating an activated diagnostic function in a targeted manner. For example, ISO 14229 calls for the "returnControlToEcu" InputOutputControlParameter in the InputOutputControlByIdentifier diagnostic service or also the "StopRoutine" subfunction in the RoutineControl diagnostic service.

This method for the targeted deactivation is suitable, in particular, when an irregular diagnostic intervention is possible without first starting a "non-default" diagnostic session and/or when a diagnostic communication has been implemented, which does not strictly adhere to the methods described in ISO 14229.

The aforementioned diagnostic functions are provided as a service for troubleshooting using workshop testers under controlled conditions in the workshop or in production. Due to the increasing networking and connectivity in vehicles, misuse of diagnostic functions, for example, in order to interfere with the driving operation in a targeted manner, is to be prevented with the aid of suitable countermeasures.

A method for operating a bus system is therefore provided, both for the aforementioned case of stateful protocols as well as for the aforementioned case of stateless protocols, in which a message of the bus system is received and its validity is ascertained (i.e., for example, during a two-step evaluation of the validity to determine whether the message is valid or not). In the case in which it has been ascertained that the message is "not valid", it is provided to send a defend message to a designated recipient of the message. The designated recipient may be, in particular, a user of the bus system. It is provided that the defend message is configured so that the designated recipient is instructed by way of the defend message to initiate defensive measures against the message. The method is not limited to one single designated recipient in this case. It is also conceivable to carry out the method for a plurality of designated recipients.

Since defensive measures which are already present in the recipient (so-called on-board arrangement) are therefore utilized for defense, a system becomes "plug-and-play"-capable particularly easily with the aid of this method.

The validity may be ascertained, for example, by monitoring the network communication and linking it to output values of one or multiple sensor(s) (the term "sensor" may be understood to be so broad in this case that it also includes an assigned evaluation unit in a control unit). If, for example, a sensor now receives an alert that an anomaly is present (for example, because an abnormal jump of the desired torque of a brake transmitted within the network is detected in the message and/or because an irregular diagnostic query is detected because predeterminable conditions for the permissibility of the diagnostic query are not met because, for example, an actuating-element test is requested while the vehicle is moving), it is decided that the message is not valid.

The following specific embodiments are advantageous, in particular, for the aforementioned case of stateful protocols.

In particular, the defend message may then be configured for prompting the designated recipient to deactivate an active, i.e., presently running, "non-default" diagnostic session and/or to start a further "non-default" diagnostic session.

In one particularly effective refinement, the defend message may be configured for prompting the designated recipient to carry out a protocol switch from a diagnostic protocol assigned to the "non-default" diagnostic session to another diagnostic protocol. Advantageously, priorities are assigned to the diagnostic protocols in this case, and a higher priority is assigned to the diagnostic protocol other than the diagnostic protocol which is assigned to the "non-default" diagnostic session.

In yet another particularly simple refinement, the defend message may be configured for prompting the designated recipient to deactivate the message. This may be carried out, for example, in the "InputOutputControlByIdentifier" diagnostic service defined in ISO 14229 with the aid of the "returnControlToEcu" InputOutputControlParameter called for therein, or in the "RoutineControl" diagnostic service, which is likewise defined in ISO 14229, with the aid of the "StopRoutine" subfunction.

In further aspects, the use of stateful protocols such as, for example, the CCP (CAN Calibration Protocol) and XCP (Universal Calibration Protocol), which are utilized in motor vehicles for measuring, stimulating, and adjusting, may be provided.

For example, in one particularly simple refinement, the defend message may be configured for prompting the designated recipient to deactivate the message which was detected as being "not valid" (for example, a stimuli intervention such as, for example, an initiated measuring intervention) by way of the defend message being configured so that it transmits a command to stop a reaction triggered by the detected message, for example, a reaction to the stimuli intervention, for example the START-STOP-DATA-TRANSMISSION command which is defined both in the CCP standard and in the XCP standard. When XCP is utilized, the designated recipient may then be prompted by way of the same defend message, for example, the START-STOP-DATA-TRANSMISSION command, to deactivate the initiated non-valid stimuli intervention.

If the reaction triggered by the message which was detected as being "not valid" is an adjustment intervention, the defend message may be configured, for example, so that it represents a command for switching the data set to the reference page of the memory, for example, the SET-CALIBRATION-PAGE command which is defined both in the CCP standard and in the XCP standard.

In yet another particularly simple aspect, the message may be configured so that it triggers the closing of an existing connection in the designated recipient by sending a defend message. This may take place, for example, by the DISCONNECT command which is defined both in the CCP standard and in the XCP standard. Since the interventions carried out in the designated recipient may be fended off with the aid of this refinement independently of the area of application of the message that was detected as being "not valid", this refinement of the defensive measure is a highly generic and, therefore, simple method.

The following refinements, in particular, are advantageous for the aforementioned case of stateless protocols. For example, in one particularly simple refinement, defensive mechanisms of the designated recipient may then be utilized by way of the defend message being configured to be identified by the designated recipient as a "not valid" message. This means, by way of the (targeted) injection of faulty messages for which monitoring mechanisms are present in the designated recipient, the substitute reactions provided therefor are provoked.

For this purpose, the defend message may be equipped with a false data length code ("DLC") and/or a false cyclic redundancy check ("CRC") code and/or a false message counter (also known as an "alive counter") and/or an implausible signal value and/or a false signal qualifier in order to therefore immediately trigger an error detection.

The signal qualifier may be a separate signal having a length of, e.g., 1-2 bits. This signal may be utilized by the sender in order to inform the recipient about the invalidity of the transmitted information (for example, due to a sensor which was detected as being defective).

The defend message may include, alternatively or additionally, an identifier which is identical to that of the received message in order to therefore generate a false cycle time/transmission period in the event that the received message is cyclically transmitted.

Alternatively or additionally, the defend message may be assigned a priority that is higher than the priority of the received message. This may be a numerical value—for example on a multi-step, discrete scale—which increases the priority by one or multiple steps with respect to the received message. If the designated recipient now receives the message and the defend message, it may therefore be ensured that the designated recipient processes the defend message before the message. The method is therefore particularly secure.

The defend message may additionally contain a substitute value for a signal, which is intended to be transmitted to the designated recipient along with the message. For example, it is possible that the substitute value is selected so that the motor vehicle is transferred into a secure state.

Independently of whether the aforementioned case of stateful or stateless protocols is present, the following refinements are particularly advantageous:

In one further aspect it may be provided, for example, that, in addition to the defend message, one further defend message is additionally transmitted. The further defend message may be the same message as the defend message. It may also be different from the defend message and, for example, may be configured according to one of the variants listed above. The method becomes particularly effective in this way.

In one particularly secure refinement, it may be provided that further defend messages are transmitted for as long as it takes to establish that the designated recipient has initiated a defensive measure.

In yet another aspect, it may be provided that the received message is stored if it has been classified as "valid", i.e., not as "not valid", when a two-step validity scale is used.

Furthermore, it may be provided that a decision is made whether to classify the message as "valid" depending on the received stored messages. Such a method is adaptive, in a particularly easy way.

By way of upholding the compatibility and utilization of existing on-board arrangement for defense, the described method is likewise retrofittable at any time on all processing units which have access to the motor vehicle network, for example, control units and gateways in the vehicle or also in connectivity units or downstream processing units, for example, the "cloud".

The method may therefore be utilized at an arbitrary point in a network of a motor vehicle, for example, as an integrated component of one or multiple control units, of a gateway or in connectivity units which may be subsequently connected to the network, for example, via OBD plugs. Moreover, no further elements or modifications in the architecture of the motor vehicle are necessary, i.e., the method is particularly easy to use.

Specific embodiments of the present invention are described in greater detail in the following with reference to the drawings.

DETAILED DESCRIPTION

Figure 1:
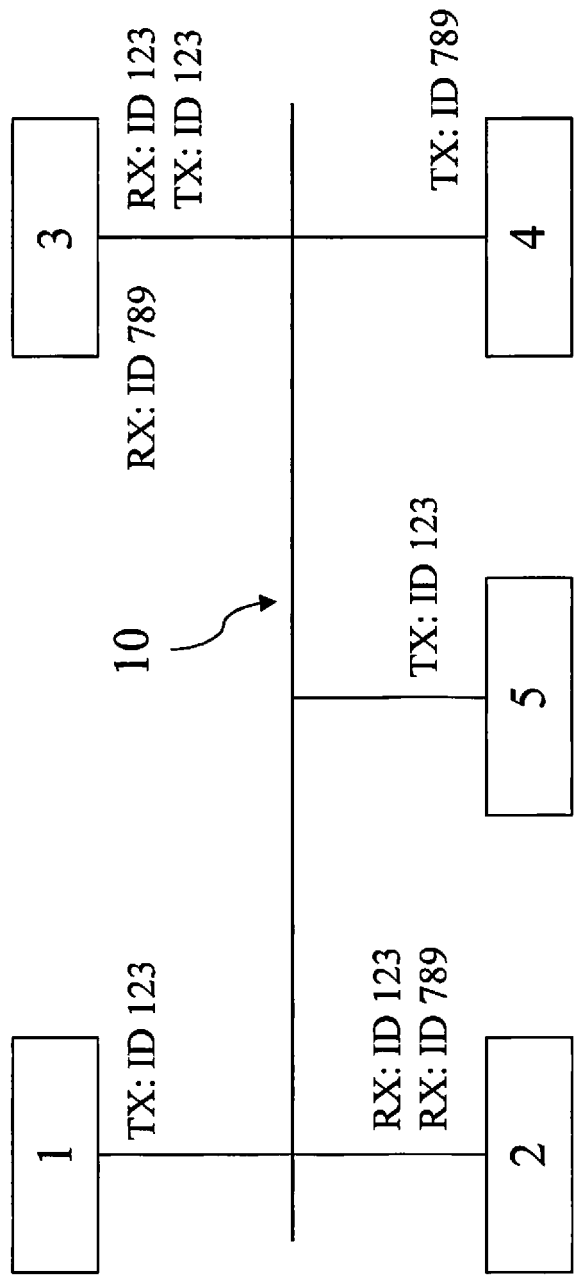
FIG. 1 schematically shows a network in which the method according to the present invention may be utilized.

FIG. 1 shows, by way of example, a network including a bus system 10 via which users 1, 2, 3, 4 communicate. Users 1, 2, 4 may each be, for example, control units, or sensors, for example. User 3 is a control unit on which, in the exemplary embodiment, the present invention is implemented.

Via bus system 10, users 1, 2, 3, 4 exchange messages which are each provided with an identifier ("ID"). The words "message" and "exchange message" are used synonymously. The transmission of a message is labeled in FIG. 1 using "TX" and the associated identifier of the transmitted message, and the receipt of a message is labeled using "RX" and the associated identifier of the received message. In FIG. 1, user 1 transmits a message having identifier "123". This message is received by user 2. User 4 transmits a message having identifier "789". This message is received by users 2 and 3.

In the exemplary embodiment, user 3 receives all messages defined in network 10. An attacker 5, which is also a user in network 10, also transmits a message having identifier "123". User 2 receives this message as well but does not recognize it as an attack since, for example, the CRC code of the message has been correctly simulated using identifier "123". User 2 therefore utilizes the manipulated message content further in the processing of its program code. User 3, however, recognizes (for example, by way of a plausibility check of the data content of message "123") that message "123" is not valid and may initiate defensive measures.

Figure 2:
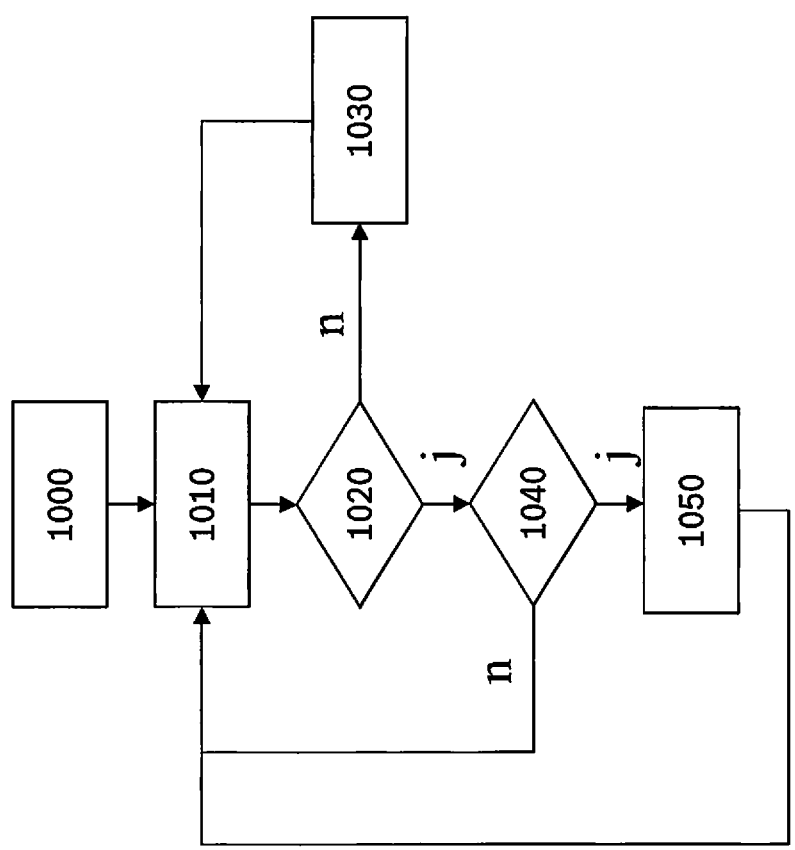
FIG. 2 shows a flow chart of the method according to one aspect of the present invention.

FIG. 2 shows the sequence of the method which, in the exemplary embodiment illustrated in FIG. 1, runs on user 3. For example, user 3 includes a machine-readable memory medium on which a computer program is stored, which carries out the steps of this method when it is carried out on user 3, i.e., when the computer program is configured for carrying out this method. The method begins in step 1000 in which, for example, user 3 logs on to network 10 or activates an IDS application. This is followed by step 1010 in which user 3 monitors the communication in network 10 and receives the messages transmitted via the network. These messages may be buffered, for example, in a queue. The following steps are advantageously carried out individually for each of the messages.

The processing of a received message begins in subsequent step 1020. In this step, a check is carried out to determine whether the received message is of a known type. For example, this may take place by looking up in a database in which messages are stored so as to be searchable according to characteristic properties (for example, the reactions they trigger in their designated recipient). If the received message is found in such a database, its type is considered to be known; otherwise its type is considered to be unknown. If this is not the case (output "n"), i.e., if the received message is not of a known type, step 1030 takes place, in which an internal or external warning may optionally take place, stating that an unknown message has been received, and the method returns to step 1010.

However, if the message is known (output "y"), step 1040 takes place, in which a check is carried out to determine whether the message is "valid" or "not valid". If the message is "not valid", an attack is detected (output "y") and step 1050 takes place; otherwise (output "n") the method returns to step 1010.

In step 1050, user 3 introduces further data into network 10, and monitoring mechanisms built into the characteristics of these data are implemented in the designated recipient of the "not valid" message and, there, predefined defensive measures are initiated. For this purpose, user 3 transmits a defend message to the designated recipient of the "not valid" message identified as an attack. This defend message may have the same identifier, for example, as the "not valid" message. The defend message may also include an alternative identifier, provided the message including this alternative identifier triggers a substitute reaction in the designated recipient, which covers the attacked system, i.e., neutralizes the effect of the "not valid" message or reduces the criticality of the consequences.

Optionally, in step 1050, the message recognized as "not valid" is recorded and is stored in a memory in the motor vehicle and/or outside of the motor vehicle. Alternatively or additionally, the fact that the message has been recognized as "not valid" may be signaled to the driver of the motor vehicle or, e.g., the manufacturer. This may take place, for example, with the aid of a message in the dashboard and/or with the aid of an infotainment system and/or with the aid of a message to linked services outside of the motor vehicle.

For example, user 3 injects a message on the same identifier "123" using a false CRC code (which the attacker had correctly simulated in its attack) into network 10 in the aforementioned abnormal jump of the desired brake torque.

The CRC check in the designated recipient (here: user 2) now fails and the appropriate substitute reactions are initiated.

Alternatively or additionally, the following method may be provided. Initially, a check is optionally carried out on the basis of the received message (for example, on the basis of an identifier contained in this message) to determine who the designated recipient is or which user 1, 2, 4 is affected by the message recognized as "not valid". It is therefore possible to trigger the defensive mechanism for the affected users 1, 2, 4 in a targeted manner.

This pass of the method therefore ends and the method returns to step 1010.

It may be provided that user 3 keeps injecting "corrupted" data until a substitute reaction has been reliably triggered or until user 3 does not detect any more manipulations.

Figure 3:
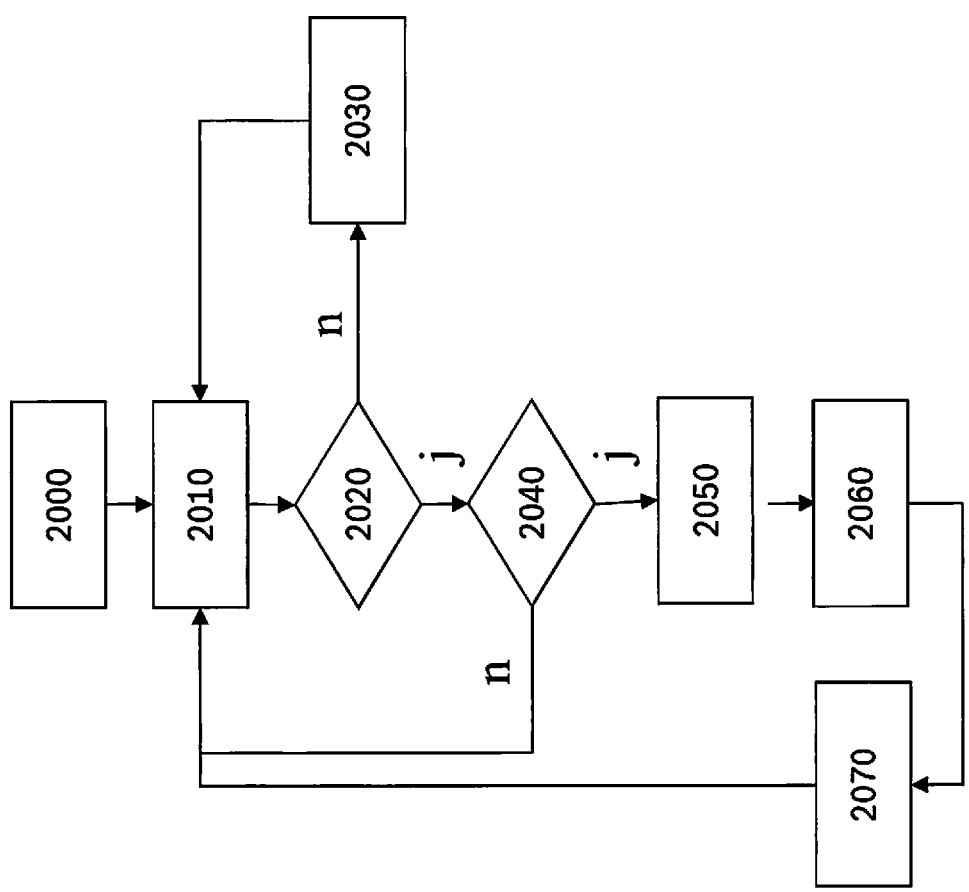
FIG. 3 shows a flow chart of the method according to yet another aspect of the present invention.

FIG. 3 shows the sequence of the method according to yet another aspect of the present invention, which is implemented in user 3 in the same way as the method illustrated in FIG. 2 in the exemplary embodiment illustrated in FIG. 1.

The method begins in step 2000 in which, for example, user 3 logs on to network 10 or activates an IDS application. This is followed by step 2010 in which user 3 monitors the communication in network 10 and receives the messages transmitted via the network. These messages may be buffered, for example, in a queue. The following steps are advantageously carried out individually for each of the messages.

The processing of a received message begins in subsequent step 2020. In this (optional) step 2020, a check is initially carried out to determine whether the received message is relevant. For this purpose, it may be checked, for example, whether the received message is a message which is suitable for activating a diagnostic function in one or several of the designated recipients (in this case the received message is also referred to as a "diagnostic message"). If this is not the case (output "n"), step 2030 takes place.

In (optional) step 2030, the received message (e.g., including meta information) is buffered in a message buffer and may therefore be optionally utilized in step 2020 to check for irregular interventions in order to also detect sequences of messages which are not "not valid" individually but rather as a sequence. Other predefined parameters which are identified in network 10 as relevantly defined messages may likewise be stored in this message buffer for the detection. The buffer may be emptied again, for example, by way of an implementation as a FIFO memory or by monitoring time stamps. The method then jumps back to step 2010.

If it is recognized in step 2020, however, that the received message is not valid (output "y"), step 2040 takes place. This may take place, for example, as in step 1020, or, alternatively or additionally, by way of it having been detected that a "non-default" diagnostic session has been activated and, in addition, a diagnostic function classified as critical is activated in the received message. This may be further optionally limited to certain operating areas of the motor vehicle, for example, by checking, as an additional condition, whether the motor vehicle is actually traveling. If this is the case (output "y"), the activation of countermeasures takes place in step 2050; otherwise (output "n"), the method jumps back to step 2010.

In step 2050 the countermeasure may take place as described in step 1050. Alternatively or additionally, the following method may be provided. Initially, a check is optionally carried out on the basis of the received message (for example, on the basis of an identifier contained in this message) to determine who the designated recipient is or which users 1, 2, 4 are affected by the irregular diagnostic intervention. It is therefore possible to trigger the defensive mechanism for the affected users 1, 2, 4 in a targeted manner.

In order to fend off irregular diagnostic interventions, user 3 may then prompt—with the aid of further diagnostic functions—the designated recipient to terminate the irregularly activated diagnostic function. This may take place, as described, via a generic method, by exiting the active non-default diagnostic session, or via a targeted method for terminating the irregularly activated diagnostic function with the aid of a subfunction of a further diagnostic service. User 3 transmits the corresponding queries to the designated recipient. In this case, the same addressing via which the irregular intervention took place may be utilized in network 10 or, alternatively, via another predefined addressing, with the aid of which the designated recipient may be approached for diagnostic queries.

Optional step 2060 then takes place, in which the detected irregular diagnostic intervention is recorded and is stored in a memory in the motor vehicle and/or outside of the motor vehicle.

Optional step 2070 likewise takes place, in which the detected irregular diagnostic intervention is signaled to the driver of the motor vehicle or, for example, to the manufacturer. This may take place, for example, with the aid of a message in the dashboard and/or with the aid of an infotainment system and/or with the aid of a message to linked services outside of the motor vehicle.

This pass of the method therefore ends and the method returns to step 2010.

What is claimed is:

1. A method for operating a bus system, the method comprising:
   receiving, by a first user device on the bus system from a second user device on the bus system, a message of the bus system, the message is intended for receipt by a designated recipient of the message and includes an identifier associated with the designated recipient, the designated recipient is a third user device on the bus system, the third user device is different than the first user device and different than the second user device, the first user device is different than the second user device;
   ascertaining, by the first user device, a validity of the message;
   determining, by the first user device, the message is "not valid" based on the ascertaining;
   based on determining the message is "not valid," transmitting on the bus system by the first user device, a defend message to the designated recipient of the message;
   wherein the defend message is configured to trigger the designated recipient to initiate defensive measures against the message; and
   wherein the bus system is within a motor vehicle.

2. The method of claim 1, wherein the defend message is configured for prompting the designated recipient to deactivate an active "non-default" diagnostic session in the motor vehicle.

3. The method of claim 2, wherein the defend message is configured for prompting the designated recipient to start a further "non-default" diagnostic session in the motor vehicle.

4. The method of claim 2, wherein the defend message is configured for prompting the designated recipient to initiate a protocol switch from a diagnostic protocol assigned to the "non-default" diagnostic session to another diagnostic protocol.

5. The method of claim 1, wherein the defend message includes a DISCONNECT command of the CCP standard and/or the XCP standard.

6. The method of claim 1, wherein the defend message is configured for prompting the designated recipient to deactivate the message.

7. The method of claim 6, wherein the defend message is identifiable by the designated recipient as a "not valid" message.

8. The method of claim 7, wherein the defend message has one or several of the following features:
a false DLC,
a false CRC,
a false message counter,
an identifier that is the same as that of the received message,
a priority which is higher than the priority of the received message,
signal value,
a substitute value for a signal, and
a false signal qualifier.

9. The method of claim 1, wherein one further defend message is transmitted.

10. The method of claim 9, wherein further defend messages are transmitted for as long as it takes for the designated recipient to initiate a defensive measure.

11. The method of claim 1, further comprising:
receiving, by the first user device, a plurality of messages;
determining, by the first user device, that the plurality of messages are "valid"; and
storing the plurality of messages determined to be "valid".

12. The method of claim 11, wherein a decision is made whether to classify the message as "valid" depending on the received stored messages.

13. The method as recited in claim 1, wherein the defend message includes a false CRC code.

14. The method as recited in claim 1, wherein the message from the second user device is also received by the designated recipient of the message.

15. The method as recited in claim 1, wherein the first user device receives all messages in the network.

16. The method as recited in claim 1, wherein the first user device includes a non-transitory machine readable memory medium on which a computer program is stored which, when executed by a control unit, causes the control unit to perform the receiving step, the ascertaining step, the determining step, and the transmitting step.

17. The method as recited in claim 1, wherein in the determining step, the first user device determines the message is "not valid" based on an output value from a sensor.

18. The method as recited in claim 1, further comprising:
receiving, by the designated recipient, the message from the second user device;
receiving, by the designated recipient, the defend message from the first user device; and
based on the received defend message, initiating, by the designated recipient, a defensive measure against the message from the second user device.

19. The method as recited in claim 18, wherein the defensive measure includes terminating, by the designated recipient, an activated diagnostic function of the motor vehicle.

20. The method as recited in claim 18, wherein the defensive measure includes closing, by the designated recipient, an existing connection.

21. The method as recited in claim 18, wherein the defend message has a higher priority than the message.

22. The method as recited in claim 18, further comprising:
determining, by the first user device, whether the message from the second user device is a message for activating a diagnostic function in designated recipient;
wherein the defensive measure includes terminating, by the designated recipient, the activated diagnostic function.

23. The method as recited in claim 1, further comprising:
determining, by the first user device, an identity of the designated recipient based on the identifier included in the message, wherein the transmitting of the defend message to the designated recipient is also based on the identity.

24. A non-transitory computer readable medium having a computer program, which is executable by a processor, comprising:
a program code arrangement having program code for operating a bus system, by performing the following:
receiving, by a first user device on the bus system from a second user device on the bus system, a message of the bus system, the message is intended for receipt by a designated recipient of the message and includes an identifier associated with the designated recipient, the designated recipient is a third user device on the bus system, the third user device is different than the first user device and different than the second user device, the first user device is different than the second user device;
ascertaining, by the first user device, a validity of the message;
determining, by the first user device, the message is "not valid" based on the ascertaining;
based on determining the message is "not valid," transmitting on the bus system by the first user device, a defend message to the designated recipient of the message;
wherein the defend message is configured to trigger the designated recipient to initiate defensive measures against the message; and
wherein the bus system is within a motor vehicle.

25. The computer readable medium of claim 24, wherein the defend message is configured for prompting the designated recipient to deactivate an active "non-default" diagnostic session in the motor vehicle.

26. A control and/or regulating device, comprising:
a control arrangement configured to perform the following:
receiving, by a first user device on the bus system from a second user device on the bus system, a message of the bus system, the message is intended for receipt by a designated recipient of the message and includes an identifier associated with the designated recipient, the designated recipient is a third user device on the bus system, the third user device is different than the first user device and different than the second user device, the first user device is different than the second user device;
ascertaining, by the first user device, a validity of the message;
determining, by the first user device, the message is "not valid" based on the ascertaining;

based on determining the message is "not valid," transmitting on the bus system by the first user device, a defend message to the designated recipient of the message;

wherein the defend message is configured to trigger the designated recipient to initiate defensive measures against the message; and wherein the bus system is within a motor vehicle.

27. The control and/or regulating device as recited in claim 26, wherein the first user device includes a non-transitory machine readable memory medium on which a computer program is stored which, when executed by a control unit, causes the control unit to perform the receiving step, the ascertaining step, the determining step, and the transmitting step.

28. A method for operating a bus system, the method comprising:

receiving, by a first user on the bus system from a second user device on the bus system, a message of the bus system, the message is intended for receipt by a designated recipient of the message and includes an identifier associated with the designated recipient, the designated recipient is a third user different than the first user and different than the second user, the first user is different than the second user;

ascertaining, by the first user, a validity of the message;

determining, by the first user, the message is "not valid" based on the ascertaining;

based on determining the message is "not valid," transmitting by the first user, a defend message to the designated recipient of the message;

wherein the defend message is configured to trigger the designated recipient to initiate defensive measures against the message; and wherein the bus system is within a motor vehicle.

29. The method as recited in claim 28, wherein the first user includes a non-transitory machine readable memory medium on which a computer program is stored which, when executed by a control unit, causes the control unit to perform the receiving step, the ascertaining step, the determining step, and the transmitting step.

30. The method as recited in claim 29, wherein the transmitting by the first user of the defend message to the designated recipient of the message includes transmitting on the bus system, by the first user, the defend message to the designated recipient of the message.

31. The method as recited in claim 30, wherein the third user is on the bus system.

32. The method as recited in claim 28, wherein in the determining step, the first user determines the message is "not valid" based on an output value from a sensor.

* * * * *